(12) United States Patent
Satou et al.

(10) Patent No.: US 8,136,420 B2
(45) Date of Patent: *Mar. 20, 2012

(54) GEAR AND GEAR DRIVE UNIT

(75) Inventors: Masanori Satou, Iwata (JP); Yoshiyasu Nakano, Iwata (JP); Katsufumi Abe, Iwata (JP)

(73) Assignee: NTN Corporation, Osaka-shi (JP)

( * ) Notice: Subject to any disclaimer, the term of this patent is extended or adjusted under 35 U.S.C. 154(b) by 288 days.

This patent is subject to a terminal disclaimer.

(21) Appl. No.: 12/445,485

(22) PCT Filed: Oct. 23, 2006

(86) PCT No.: PCT/JP2006/321011
§ 371 (c)(1),
(2), (4) Date: Apr. 14, 2009

(87) PCT Pub. No.: WO2008/050378
PCT Pub. Date: May 2, 2008

(65) Prior Publication Data
US 2010/0071495 A1  Mar. 25, 2010

(51) Int. Cl.
*F16H 55/17* (2006.01)
(52) U.S. Cl. .......................................... 74/434
(58) Field of Classification Search ............... 74/412 R, 74/434, 454, 459.5, 460
See application file for complete search history.

(56) References Cited

U.S. PATENT DOCUMENTS

| | | | | |
|---|---|---|---|---|
| 2,279,216 A | * | 4/1942 | Way ................................ | 74/460 |
| 5,064,298 A | * | 11/1991 | Hibi et al. ....................... | 384/625 |
| 5,159,852 A | * | 11/1992 | Harimoto ........................ | 74/559 |
| 5,352,303 A | * | 10/1994 | Murakami et al. ............. | 148/318 |
| 5,595,613 A | | 1/1997 | Hatano et al. | |
| 5,643,054 A | * | 7/1997 | Bach et al. ...................... | 451/34 |
| 6,732,606 B1 | * | 5/2004 | Zhu et al. ........................ | 74/460 |
| 2003/0123769 A1 | * | 7/2003 | Ohki ............................... | 384/492 |
| 2007/0151633 A1 | | 7/2007 | Ohki et al. | |

FOREIGN PATENT DOCUMENTS

| | | |
|---|---|---|
| JP | 01-030008 B2 | 6/1989 |
| JP | 4-56254 U | 5/1992 |

(Continued)

OTHER PUBLICATIONS

Notification of Transmittal of Translation of the International Preliminary Report on Patentability (Form PCT/IB/338) of International Application No. PCT/JP2006/321011 mailed May 7, 2009 with Forms PCT/IB/373 and PCT/ISA/237.

(Continued)

*Primary Examiner* — Justin Krause
(74) *Attorney, Agent, or Firm* — Westerman, Hattori, Daniels & Adrian, LLP

(57) ABSTRACT

Provided are a gear in which oil film formation between the tooth surfaces of gears rotating at high speed can be effected to a sufficient degree, in which generation of pitting, abrasion, and scoring is prevented, and which helps to prevent an increase in temperature and wear to achieve an improvement in durability, and a gear drive unit. A multitude of minute concave recesses are provided at random on a tooth surface, and an average area of the recesses is set to a range of 160 to 740 $\mu m^2$. Accordingly, the tooth surface can obtain a high oil film forming capacity. Thus, even under a low-viscosity/thin-lubrication condition in which the thickness of the oil film is extremely small, it is possible to achieve a long service life.

6 Claims, 7 Drawing Sheets

FOREIGN PATENT DOCUMENTS

| | | |
|---|---|---|
| JP | 07-242994 A | 9/1995 |
| JP | 11-230312 A | 8/1999 |
| JP | 2002-031212 A | 1/2002 |
| WO | 2005/036003 A1 | 4/2005 |

OTHER PUBLICATIONS

International Search Report of PCT/JP2006/321011, Mailing Date of Jan. 30, 2007.

* cited by examiner

FIG. 3(A)
FIG. 3(B)
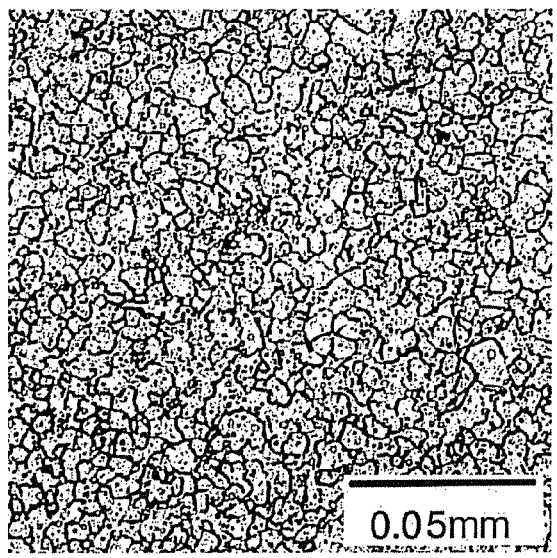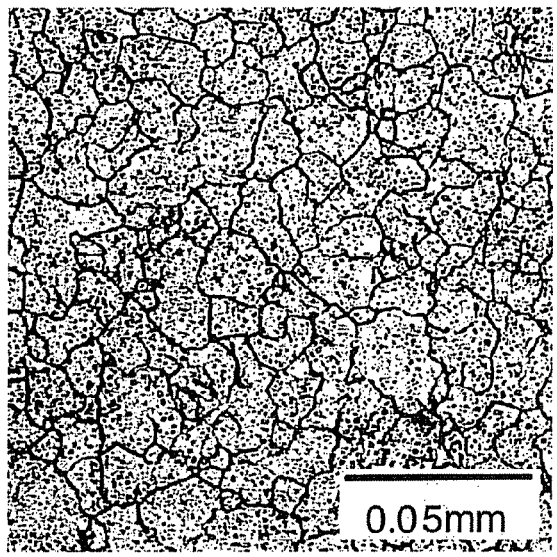
FIG. 4(A)
FIG. 4(B)
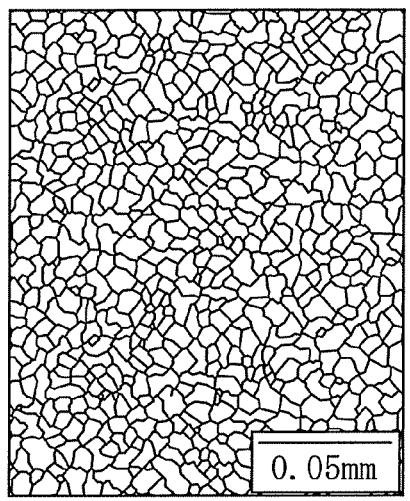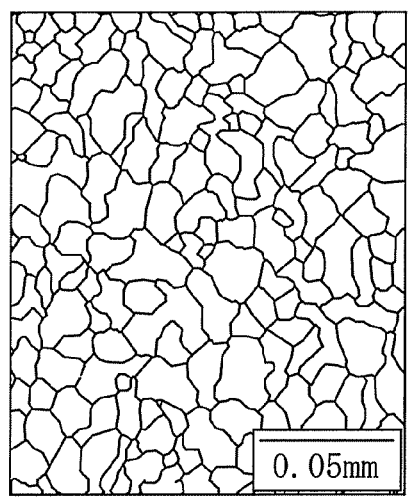

| BEARING | SERVICE LIFE RATIO | SURFACE PROPERTIES | | | | DIMPLE CONFIGURATION | |
|---|---|---|---|---|---|---|---|
| | | $R_{yni}$ ($\mu$m) | $R_{qni}$ ($\mu$m) | $R_{ymax}$ ($\mu$m) | $S_k$ | AREA RATIO (%) | AVERAGE AREA ($\mu m^2$) |
| A (COMPARATIVE EXAMPLE) | 1 | 0.337 | 0.053 | 0.739 | 0.06 | – | – |
| B (COMPARATIVE EXAMPLE) | 1.6 | 0.695 | 0.095 | 0.980 | -0.83 | 20 | 120 |
| C (EXAMPLE) | 2.0 | 0.873 | 0.136 | 1.342 | -2.05 | 36 | 165 |
| D (EXAMPLE) | 3.8 | 1.563 | 0.269 | 1.881 | -1.44 | 75 | 11667 |
| E (EXAMPLE) | 4.0 | 2.332 | 0.450 | 2.970 | -1.31 | 67 | 3894 |

FIG. 10(a)

| | SURFACE TREATMENT ON TEST GEAR (COMPARATIVE EXAMPLE) | | NUMBER OF TIMES OF LOAD APPLICATION |
|---|---|---|---|
| | DRIVE SIDE | DRIVEN SIDE | |
| FIRST TIME | NO SURFACE TREATMENT | NO SURFACE TREATMENT | $6.0 \times 10^6$ |
| SECOND TIME | NO SURFACE TREATMENT | NO SURFACE TREATMENT | $5.0 \times 10^6$ |

FIG. 10(b)

| | SURFACE TREATMENT ON TEST GEAR (EXAMPLE) | | NUMBER OF TIMES OF LOAD APPLICATION |
|---|---|---|---|
| | DRIVE SIDE | DRIVEN SIDE | |
| FIRST TIME | WITH SURFACE TREATMENT | NO SURFACE TREATMENT | $1.25 \times 10^7$ |
| SECOND TIME | WITH SURFACE TREATMENT | NO SURFACE TREATMENT | $1.50 \times 10^7$ |

FIG. 10(c)

| | SURFACE TREATMENT ON TEST GEAR (EXAMPLE) | | NUMBER OF TIMES OF LOAD APPLICATION |
|---|---|---|---|
| | DRIVE SIDE | DRIVEN SIDE | |
| FIRST TIME | WITH SURFACE TREATMENT | WITH SURFACE TREATMENT | $2.0 \times 10^7$ |
| SECOND TIME | WITH SURFACE TREATMENT | WITH SURFACE TREATMENT | $2.0 \times 10^7$ |

FIG. 11

| No. | NITROGEN CONTENT (%) | RESIDUAL AUSTENITE (%) | HARDNESS (Hv) | SERVICE LIFE WITH FOREIGN MATTER (h) | AUSTENITE GRAIN SIZE | REMARKS |
|---|---|---|---|---|---|---|
| 1 | 0.11 | 14 | 725 | 321 | 11.8 | EXAMPLE 1 |
| 2 | 0.16 | 18 | 735 | 378 | 12.0 | EXAMPLE 2 |
| 3 | 0.18 | 20 | 730 | 362 | 11.9 | EXAMPLE 3 |
| 4 | 0.32 | 22 | 730 | 396 | 12.1 | EXAMPLE 4 |
| 5 | 0.61 | 24 | 715 | 434 | 12.2 | EXAMPLE 5 |
| 6 | 0 | 8 | 770 | 72 | 9.8 | COMPARATIVE EXAMPLE 1 |
| 7 | 0.32 | 32 | 710 | 155 | 10.0 | COMPARATIVE EXAMPLE 2 |
| 8 | 0.72 | 31 | 700 | 123 | 12.0 | COMPARATIVE EXAMPLE 3 |

GEAR AND GEAR DRIVE UNIT

TECHNICAL FIELD

The present invention relates to a gear and a gear drive unit for use, for example, in the power transmitting portion of an automotive transmission or a gear pump.

BACKGROUND ART

Patent Document 1, for example, discloses a gear having a multitude of minute recesses provided at random in the tooth surfaces thereof. Setting is made such that the average area of the minute recesses ranges from 35 to 150 $\mu m^2$, that the proportion of the minute recesses on the tooth surfaces ranges from 10 to 40%, that the average surface roughness of the tooth surfaces provided with the minute recesses ranges from Rmax 0.6 to 2.5 $\mu m$, and that the parameter Sk value of the surface roughness of the surfaces provided with the minute recesses is in the range: $Sk \leq -1.6$. As a result, the oil film forming capacity of the surface is improved, and the oil films between the tooth surfaces of gears are formed to a sufficient degree, whereby damage due to defective lubrication such as surface-originated separation of the gear is prevented, and an improvement in terms of durability is achieved.
Patent Document 1: Japanese Utility Model Application Laid-open No. 04-56254

DISCLOSURE OF THE INVENTION

Problems to be Solved by the Invention

In recent years, portions where gears are used such as automotive transmissions are becoming still smaller and still more enhanced in output, and the use environment for lubricant oil exhibits a tendency to increase in load and temperature as can be seen from a reduction in lubricant oil viscosity. Thus, the lubrication environment for gears is becoming more severe than ever, and wear due to defective lubrication, surface-originated separation, a reduction in fatigue life due to an increase in contact pressure, and separation in an environment where foreign matter is involved are becoming still more likely to occur. That is, as a result of the adoption of a multiple-stage transmission, the torque and load applied to the gears used therein and, further, the RPM tend to increase, and a reduction in size, compatibility with high speed rotation, etc. are required of the gears. As a result, the lubrication condition for the gears are becoming still more severe, and wear and damage due to defective lubrication are likely to be generated. Thus, even if the conditions for the tooth surfaces of gears are set as disclosed in Patent Document 1, the expected effect may not be attained to a sufficient degree.

It is an object of the present invention to provide a gear in which oil film formation between the tooth surfaces of gears rotating at high speed can be effected to a sufficient degree, in which generation of pitting, abrasion, and scoring is prevented, and which helps to prevent an increase in temperature and wear to achieve an improvement in durability, and to provide a gear drive unit using such a gear.

Means for Solving the Problems

In order to attain the above-mentioned object, a gear according to the present invention includes a multitude of minute concave recesses provided at random on a tooth surface, in which an average area of the recesses is set to a range of 160 to 11667 $\mu m^2$ As described above, in the gear and the gear drive unit of the present invention, the average area of the recesses on a surface provided with the recesses of the tooth surface is set to a range of 160 to 11667 $\mu m_2$, whereby an improvement in terms of oil film forming capacity is achieved. Thus, it is possible to obtain a long service life under a thin-lubrication condition in which a thickness of an oil film is extremely small.

Further, in this gear, the surface roughness parameter Rymax in the axial direction of the surface provided with the recesses is set to a range: 1.3 $\mu m \leq Rymax \leq 3.0$ $\mu m$, whereby a further improvement in terms of oil film forming capacity is achieved. In this case, the parameter Rymax is a maximum value of a maximum height per reference length (ISO 4287: 1997).

Further, in this gear, the surface roughness in terms of parameter Rqni in the axial direction of the surface provided with recesses is set to the range: 0.13 $\mu m \leq Rqni \leq 0.5$ $\mu m$, whereby a further improvement in terms of oil film forming capacity of the tooth surface is achieved. The parameter Rqni is the square root of a value obtained by integrating the square of the deviation of the height as measured from the roughness center line to the roughness curve with respect to the measurement length section and averaging it in that section, the parameter Rqni also being called root-mean-square roughness. The Rqni can be obtained through value calculation from a section curve and a roughness curve recorded in an enlarged state, and is measured by moving the contact needle of a roughness meter in the width direction and the circumferential direction.

Further, in this gear, when the area ratio of the surface provided with recesses is set to the range of 35 to 75%, it is possible to achieve a further improvement in terms of oil film forming capacity.

It is also possible to form a nitrogen-enriched layer on the surface of the gear. The nitrogen-enriched layer is a layer which is formed on the tooth surface and in which the nitrogen content is increased. It can be formed, for example, by carbonitriding, nitriding, nitriding immersion, or the like. When the austenite crystal grains of the nitrogen-enriched layer thus formed is so fine that the grain size number thereof exceeds 10, it is possible to achieve a substantial improvement in terms of fatigue life. When the grain size number of the austenite grain size is not more than 10, no substantial improvement in terms of fatigue life is achieved. Thus, the grain size number is set in the range exceeding 10, and usually, it is 11 or more. The smaller the austenite grain size, the more desirable it is. Usually, however, it is rather difficult to attain a grain size number in excess of 13. The austenite crystal grains appear when heating is effected in heat treatment at a temperature not lower than the transformation point, and are transformed into another texture when cooled. However, also after the transformation, the marks of the austenite crystal grains remain. Here, the austenite crystal grains means the crystal grains as indicated by those marks.

It is desirable for the nitrogen content in the nitrogen-enriched layer to range from 0.1% to 0.7%. When the nitrogen content is less than 0.1%, the desired effect cannot be attained, in particular, deterioration in fatigue life occurs under a condition in which foreign matter is mixed in. When the nitrogen content is more than 0.7%, pores called voids are generated, and the desired hardness cannot be attained due to an excessively large amount of residual austenite, resulting in a short service life. Regarding the nitrogen-enriched layer formed on the tooth surface, the nitrogen content is a value as obtained at 50 $\mu m$ of the surface layer of the tooth surface, and can be measured, for example, by an EPMA (wavelength dispersive X-ray microanalyzer).

Effects of the Invention

As described above, according to the present invention, by providing at random a multitude of minute recesses, the tooth surface becomes a fine rough surface, thus facilitating the formation of an oil film. Further, those recesses constitute oil sumps, and hence the oil film formation on the slippage surface can be reliably effected. Thus, it is possible to mitigate the temperature rise, and to buffer the metallic contact between the tooth surfaces of gears in mesh with each other, making it possible to prevent generation of pitting, abrasion, and scoring also in the high speed rotation range. Thus, even under a low-viscosity/ thin-lubrication condition in which the thickness of the oil film is extremely small, it is possible to achieve a long service life for the gear and the gear drive unit. Further, through an improvement in terms of the fatigue life of the surface layer of the gear, it is possible to achieve a superior crack resistance and age dimensional change resistance.

BEST MODE FOR CARRYING OUT THE INVENTION

In the following, an embodiment of the present invention is described with reference to the drawings.

FIG. 1 illustrates an example of a transmission used in an automobile. Within a case 1, an input shaft 2, a drive pinion 3, and an output shaft 4 are arranged in series. Further, a counter shaft 5 and a reverse shaft 6 are arranged parallel to the output shaft 4, and gear groups 7 are mounted to the drive pinion 3 and the shafts 2, 4, and 5. By effecting a change in the mesh-engagement of the gear groups 7 through operation from the outside of the case 1, the fitting-in of the input shaft 2 is extracted at the output shaft 4 in a varied or reversed state. In this transmission, as the input shaft 2 rotates, oil stored in an oil pan (not shown) is splashed against the gears 7, and lubricates the gear groups 7, bearings 8 and 9, etc. before returning to the oil pan. That is, this transmission is provided with a gear drive unit having a drive gear driven by a drive force and a driven gear driven through mesh-engagement with respect to the drive gear. axial FIG. 2 illustrates a gear 7 constituting a part of the gear drive unit. The tooth surface 7a of this gear is formed as a fine rough surface in which a multitude of independent minute recesses are formed at random. In this fine rough surface, the average area of the recesses is in the range of 160 to 11667 $\mu m^2$. Further, the surface roughness parameter Rymax in the axial direction of the surface provided with the recesses is in the range: $1.3 \leq Rymax \leq 3.0$ µm. Further, the surface roughness parameter Rqni in the axial direction of this surface is in the range: $0.13 \ \mu m \leq Rqni \leq 0.5 \ \mu m$. When a special barrel polishing is performed as the surface processing treatment for obtaining this fine rough surface, it is possible to obtain a desired finish surface. However, this should not be construed restrictively, and it is also possible to use shot or the like.

In the surface layer of the tooth surface 7a of the gear 7, there is formed a nitrogen-enriched layer through treatment such as carbonitriding, nitriding, nitriding immersion, or the like, and the grain size number of the austenite crystal grains in the nitrogen-enriched layer is set to the range of beyond 10, e.g., 12. The nitrogen content at 50 µm of the surface layer of the tooth surface 4a is set to the range of 0.1 to 0.7%.

FIG. 3 are diagrams illustrating microtexture of the tooth surface of the gear, in particular, the austenite grains. FIG. 3(A) illustrates a gear in which the austenite grain size is number 12 of JIS Standard (embodiment of the present invention), and FIG. 3(B) illustrates a gear in which the grain size is number 10 (comparative example). FIGS. 4(A) and 4(B) are illustrations of the austenite grain sizes as illustrated in FIGS. 3(A) and 3(B). In the case of FIG. 3(A), the grain size as measured by a section method was 5.6 µm.

In this way, in the gear of the gear drive unit of the present invention, a multitude of minute concave recesses are provided at random, whereby the tooth surface becomes a fine rough surface, thus facilitating the formation of an oil film. Further, those recesses constitute oil sumps, and hence the oil film formation on the slippage surface can be effected reliably. Thus, it is possible to buffer the metallic contact between the tooth surfaces 7a of the gears 7 in mesh with each other, and to mitigate the temperature rise, making it possible to prevent generation of pitting, abrasion, and scoring also in the high speed rotation region, and to achieve an increase in service life. In particular, the average area of the recesses is set to the range of 160 to 11667 $\mu m^2$, whereby it is possible to prevent oil film depletion even in the case of thin lubrication, and to achieve a long service life even when the oil film is extremely thin.

Further, by setting the axial surface roughness parameter Rymax of the surface provided with the recesses to the range: $1.3 \leq Rymax \leq 3.0$ µm, or by setting the axial surface roughness parameter Rqni of this surface to the range: $0.13 \ \mu m \leq Rqni \leq 0.5 \ \mu m$, it is possible to achieve a further improvement in terms of oil film forming capacity.

The surface layer of this gear has a nitrogen-enriched layer, and the grain size number of the austenite crystal grains of this nitrogen-enriched layer exceeds 10, and hence the austenite grain size is minute, thereby achieving a substantial improvement in terms of fatigue life.

When the nitrogen content of the nitrogen-enriched layer is less than 0.1%, the fatigue life when foreign matter is mixed therein is reduced. On the other hand, when it is more than 0.7%, pores called voids are generated, or the amount of residual austenite becomes too large, resulting in insufficient hardness and short service life. Thus, by setting the nitrogen content to the range: 0.1% to 0.7%, it is possible to achieve an increase in the service life of the gear.

Thus, in the gear of the present invention, it is possible to attain a long service life under a low-viscosity and thin-lubrication in which the oil film is extremely thin, and the gear drive unit of the present invention using this gear can achieve a long service life. Further, by achieving an improvement in terms of the fatigue life of the surface layer, it is possible to attain a superior crack resistance and age dimensional change resistance.

In this way, the gear of the present invention is superior in pitting resistance, abrasion resistance, and scoring resistance, and hence it is optimum for an automotive transmission gear 7 as illustrated in FIG. 1. In an automotive automatic transmission (AT), two to three sets of planetary gear mechanisms are usually adopted, and the sun gear, the carriers, and ring gears of those planetary gear mechanisms are fastened by clutches, whereby the reduction gear ratio fluctuates. Thus, it is desirable to impart the surface properties of the present invention to the sun gear, planetary pinion, ring gear, etc. of such a planetary gear mechanism.

In a pair of gears in mesh with each other, while it is possible to achieve an effect such as a long service life to a sufficient degree by effecting surface treatment for satisfying the surface properties of the present invention solely on one of the gears, it is still more effective to perform surface treatment for satisfying the surface properties of the present invention on the tooth surfaces of both gears.

The gear of the present invention is naturally also applicable to various gear drive units other than automotive transmissions.

First Embodiment

In order to prove the usefulness of the present invention, service life evaluation was first performed on a gear. A tooth surface of a gear is held in rolling contact or sliding contact with a mating tooth surface, and this contact is similar to a contact state between the race of a roller bearing and the bearing race thereof. Thus, service life evaluation on a gear may be made based on service life test evaluation on a roller bearing. From this viewpoint, the inventors of the present invention conducted a service life test on a roller bearing under the conditions described below. In measuring the surface properties indicated by those parameters with respect to the components of a roller bearing such as rolling members and a bearing race, measurement values obtained through measurement at a single point may be regarded as reliable as a representative value. However, it is advisable to perform measurement, for example, at two points diametrically opposing to each other. The measurement method and conditions for the parameters Ryni, Rymax, Sk, and Rqni measured in this embodiment are as follows. Note that, the parameter Ryni is a mean value of the maximum height per reference length, that is, a value obtained by sampling from the roughness curve the reference length in the direction of the mean line thereof and measuring the distance between the peak line and the valley line of the sampled part in the longitudinal magnification direction of the roughness curve (ISO 4287: 1997). Further, the parameter Sk indicates a skewness of the roughness curve (ISO 4287: 1997), and serves as an index of a statistic value for knowing asymmetry of concave and convex distribution. When the distribution is symmetric like in Gaussian distribution, the Sk value becomes nearly 0. In a case where convex portions of the concave and convex are eliminated, the Sk value becomes a negative value, and in the opposite case, the Sk value becomes a positive value.

Parameter calculation standard: JIS B 0601: 1994 (Surfcom JIS 1994)
Cutoff type: Gaussian
Measurement length: 5λ
Cutoff wavelength: 0.25 mm
Measurement magnification: ×10,000
Measurement speed: 0.30 mm/s
Measurement point: roller center
Measurement number: 2
Measurement apparatus: Surface Roughness Measurement Apparatus, Surfcom 1400 A (manufactured by Tokyo Seimitsu Co., Ltd)

In performing quantitative measurement on the recesses, there is obtained an enlarged image of the roller surface, from which quantification is possible by an image analysis system on the market. Further, by using the surface property inspection method and the surface property inspection apparatus as disclosed in JP 2001-183124 A, it is possible to perform measurement accurately in a stable manner. According to this method, light is applied to an inspection surface with curvature, and the inspection surface is photographed by a camera, the luminance of an image of the inspection surface photographed by the camera is measured, and the surface properties of the inspection surface are inspected based on a light-dark pattern formed by the contrast between light portions and dark portions whose luminance has been measured. The light is applied while matched with the optical axis direction of the camera, and positioning is effected on the inspection surface such that the position where the luminance distribution of the image measured indicates a peak value is matched with the optical axis of the camera, whereby shading (luminance distribution) due to the curvature of the inspection surface is suppressed. Further, light is applied while matched with the optical axis of the camera, and, regarding the luminance distribution of the image measured, the portion of the inspection surface corresponding to the position where the luminance distribution indicates the peak value is regarded as an origin; in an orthogonal two-dimensional coordinate system, one axis of which is the symmetry axis of curvature, the one-dimensional luminance distributions as indicated by the orthogonal coordinate axes are respectively approximated by approximation functions. By means of those approximation functions, the measured image luminance corresponding to the coordinate positions is corrected so as to remove the image luminance distribution, using the peak value of the luminance distribution as a reference value. The surface properties of the inspection surface are inspected by the light-dark pattern of the luminance thus corrected, whereby it is possible to inspect the surface properties by a light-dark pattern without shading. When measuring the area ratio and the average area of the recesses with respect to the components of a roller bearing such as rolling members and bearing race, while a measurement value obtained by measurement at a single point is reliable as the representative value as in the case of the above-mentioned parameters, it is desirable to perform measurement at two points diametrically opposing to each other. The measurement conditions are, for example, as follows:

Area ratio: the proportion in the observation visual field range occupied by pixels (black) smaller than binary threshold values (light portion luminance+dark portion luminance)/2)
Average area: sum total of the black area/total number
Observation visual field: 826 μm×620 μm
Measurement point: roller center
Measurement number: 2

FIG. 5 illustrates an example of a test specimen roller bearing. This roller bearing 10 is a needle-like roller bearing in which a needle-like roller 12 is incorporated into an outer race 13 as a rolling member, with a mating shaft 14 being supported by the needle-like roller 12. There were produced a plurality of kinds of needle-like roller bearings with surface-treatments of different finish surfaces performed on the needle-like roller surfaces, and service life test was performed thereon to obtain the following results. As illustrated in FIG. 6, the needle-like roller bearing used in the service life test was a bearing provided with a retainer 15 using fifteen needle-like rollers having an outer diameter Dr of 33 mm, an inner diameter dr of 25 mm, a diameter D of the needle-like roller 12 of 4 mm, and a length L of 25.8 mm. Five kinds of test bearings differing in needle-like roller surface roughness finish were further produced. That is, there were produced a bearing A (comparative example) on which super finishing was effected after grinding, a bearing B (comparative example) on which a multitude of minute concave recesses were formed at random, a bearing C (example), a bearing D (example), and a bearing E (example).

The test apparatus used was a radial load testing machine 16 as illustrated schematically in FIG. 7, in which the test bearings 10 were mounted on both sides of a rotary shaft 17 to perform test by imparting rotation and load thereto. The finish of the inner race (mating shaft) used in the test was a polishing finish of Ra 0.10 to 0.16 μm. This was the same with the outer race (outer ring). The test conditions were as follows:

Bearing radial load: 19613 N (2,000 kgf)
RPM: 4,000 min$^{-1}$
Lubricant: Crisec oil H8 (2 cst under test condition)

FIG. 8 illustrates the finish surface characteristic value parameters of the test bearings, and the service life test results under an oil film parameter Λ=0.13. As illustrated in the drawing, the service life ratios of the test bearings with respect to the bearing A without recesses were 1.6 in the bearing B, 2.0 in the bearing C, 3.8 in the bearing D, and 4.0 in the bearing E. As is apparent from the data, the bearings C, D, and E, whose needle-like roller surfaces underwent surface treatment so as to satisfy the surface configuration of the present invention can provide a long service life equal to or more than twice that of the bearing A without recesses even under a very strict low-viscosity/ thin-lubrication condition in which the oil film parameter Λ=0.13. Thus, the gear of the present invention whose tooth surface is set to the above value range can provide a superior effect in terms of service life.

Second Embodiment

Next, gear pitting test was performed by using a spur gear fatigue testing machine illustrated in FIG. 9 for pitting strength evaluation. In FIG. 9, a drive side gear 31 (with 29 teeth) and a driven side gear 32 (with 30 teeth) are respectively mounted to one side of rotation shafts 33 and 34, and the drive side shaft 33 is driven by a motor (not shown). Further, torque is imparted by a load lever 35 and a weight 36 mounted to the drive side shaft 33. Regarding the drive side gear 31, two kinds of gears were prepared: one which had undergone surface treatment according to the present invention, and one which had undergone no surface treatment. The details of the testing conditions, etc. are as follows:
  Testing machine: spur gear fatigue testing machine
  Drive side gear: outer diameter; Ø79 mm, inner diameter; Ø35 mm, tooth width; 8.2 mm, SCr 420 (carburizing treatment), number of teeth; 29
  Driven side gear: outer diameter; Ø79 mm, inner diameter; Ø35 mm, tooth width; 15 mm, SCr 420 (carburizing treatment), number of teeth;
  RPM: 3,500 min$^{-1}$
  Torque: 186 N·m (19 kgf·m)
  Lubricant oil temperature: 80° C.
  Lubricant oil: ATF oil FIGS. 10(a) through 10(c) illustrate data on the gear pitting test. FIG. 10(a) illustrates the results (comparative example) when neither the drive side gear nor the driven side gear had undergone surface treatment, FIG. 10(b) illustrates the results (example) when surface treatment was performed on the tooth surface of the drive side gear so as to satisfy the surface properties of the present invention, and FIG. 10(c) illustrates the results (example) when surface treatment was performed on the tooth surfaces of the drive side gear and the driven side gear so as to satisfy the surface properties of the present invention. Those results prove that, in the case of FIG. 10(b), the pitting life is more than twice that of FIG. 10(a), and, in the case of FIG. 10(c), the pitting life is more than three times that of the FIG. 10(a).

Third Embodiment

Next, products of examples 1 through 5 and products of comparative examples 1 through 3 were prepared, and test was performed on them for the relationship between nitrogen content and test specimen life with foreign matter mixed therein. FIG. 11 illustrates the test results. In this test, the needle-like roller bearings as illustrated in FIGS. 5 and 6 were used as the products of examples and the products of comparative examples, with a multitude of minute concave recesses as illustrated in FIG. 8 being formed at random. The crystal grain size measurement was performed based on the steel austenite crystal grain size testing method of JIS G 0551. The test conditions are as follows:
  Radial load: 17.64 kN
  Axial load: 1.47 kN
  Rotating speed: 2,000 min$^{-1}$
  Mixing-in of hard foreign matter: 1 g/L It can be seen from FIG. 11 that, regarding the products of examples 1 through 5, the nitrogen content and the service life with foreign matter mixed therein are substantially in proportion to each other. On the other hand, seeing that, in the product of comparative example 3, in which the nitrogen content was 0.72, the service life with foreign matter mixed therein was reduced to an extreme degree, it is desirable for the upper limit of the nitrogen content to be 0.7. Further, it can be seen from the product of example 1 and the product of comparative example 1 that it is desirable for the lower limit of the nitrogen content to be 0.1. Further, seeing that the service life of the product of comparative example 2, whose nitrogen content was within the above range, was reduced, it is desirable for the austenite crystal grain size to be a value in excess of 10.

The embodiments as described in this specification are only given by way of example in all respects and should not be construed restrictively. The scope of the present invention is indicated not by the above description but by the claims, and all modifications equivalent to and within the range of the claims are to be covered by the scope of the present invention.

BRIEF DESCRIPTION OF THE DRAWINGS

[FIG. 3] Diagrams illustrating gear micro textures, in particular, austenite grains, of which portion (A) illustrates a gear according to the present invention, and portion (B) illustrates a conventional gear.

[FIG. 4] Portion (A) illustrates the austenite grain boundary of FIG. 3(A), and portion (B) illustrates the austenite grain boundary of FIG. 3(B).

[FIG. 10] Portion (a) illustrates test results of a comparative example, and portions (b) and (c) illustrate test results of examples in the second embodiment.

[FIG. 11] Table illustrating test results of the third embodiment.

Figure 1:
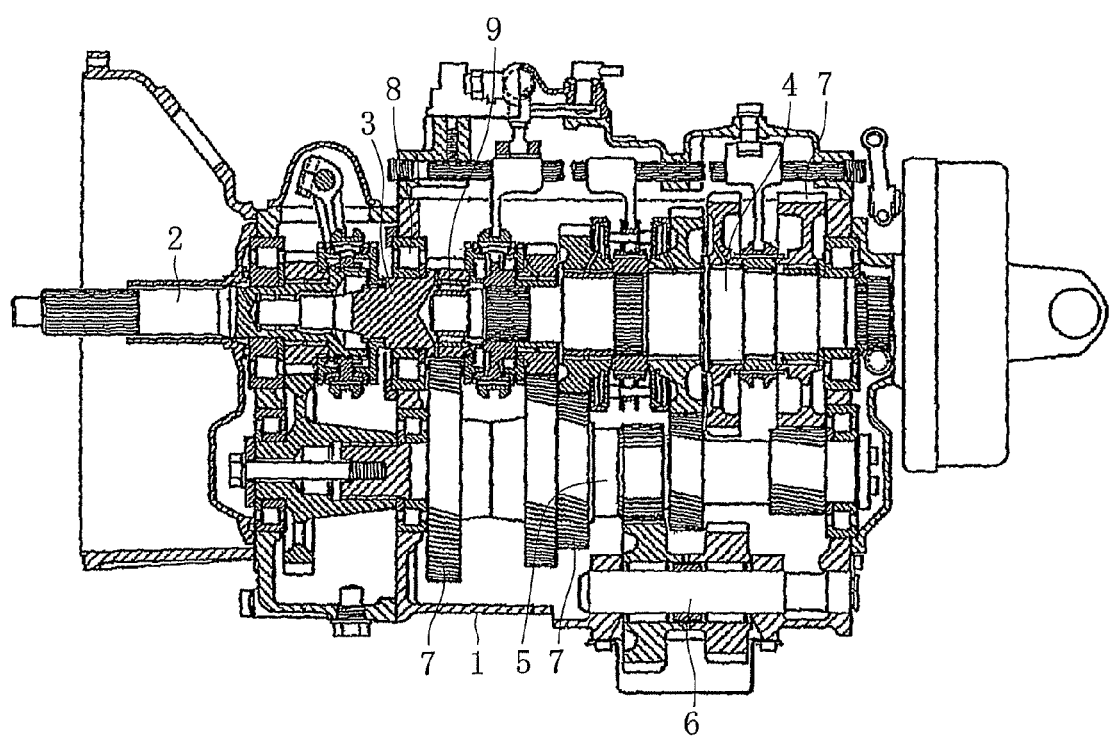
[FIG. 1] A partial sectional view of an automotive transmission.
Figure 2:
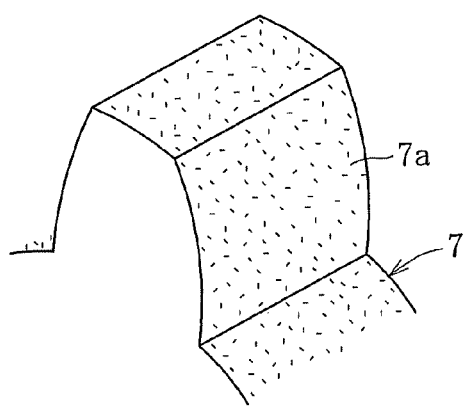
[FIG. 2] An enlarged main portion perspective view of a gear.
Figure 5:
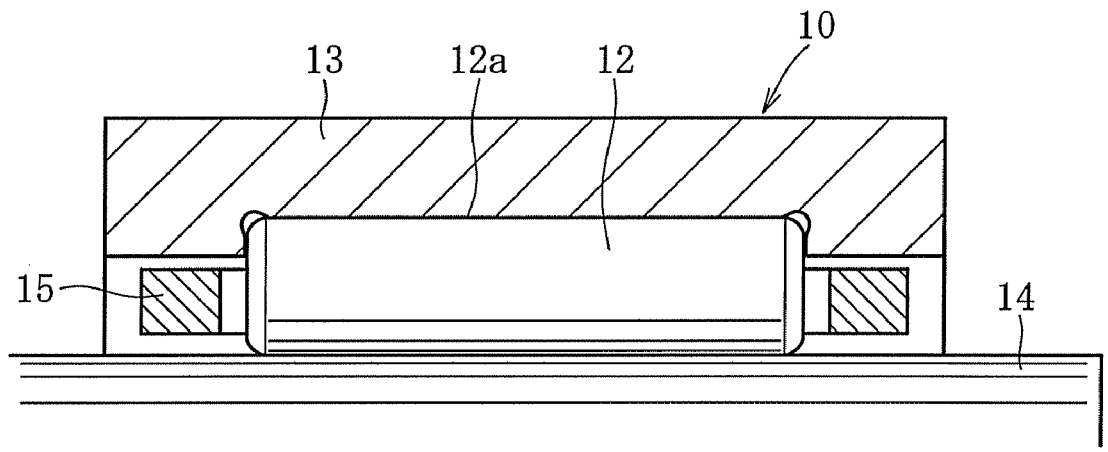
[FIG. 5] A sectional view of a needle-like roller bearing.
Figure 6:
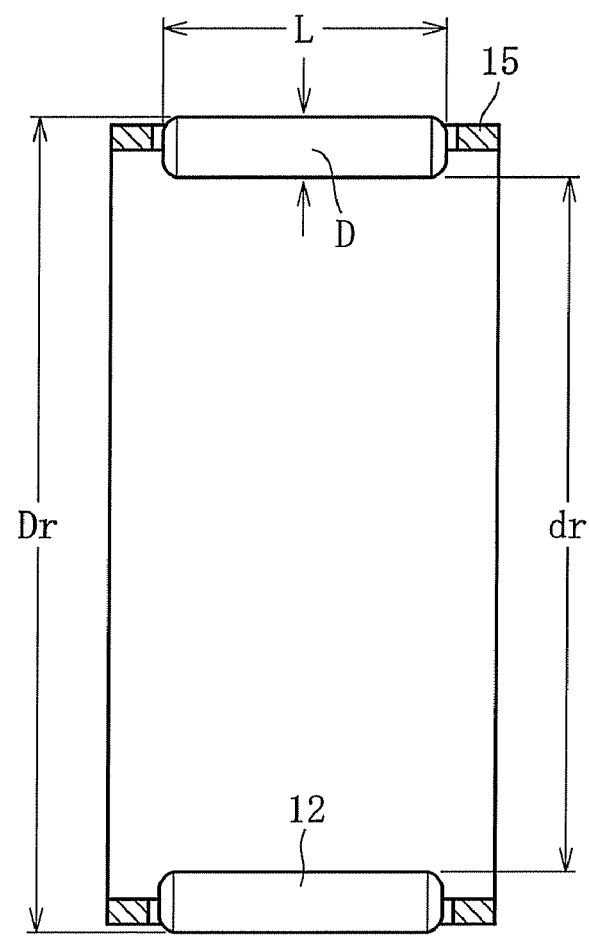
[FIG. 6] A sectional view of a needle-like roller bearing used in service life test.
Figure 7:
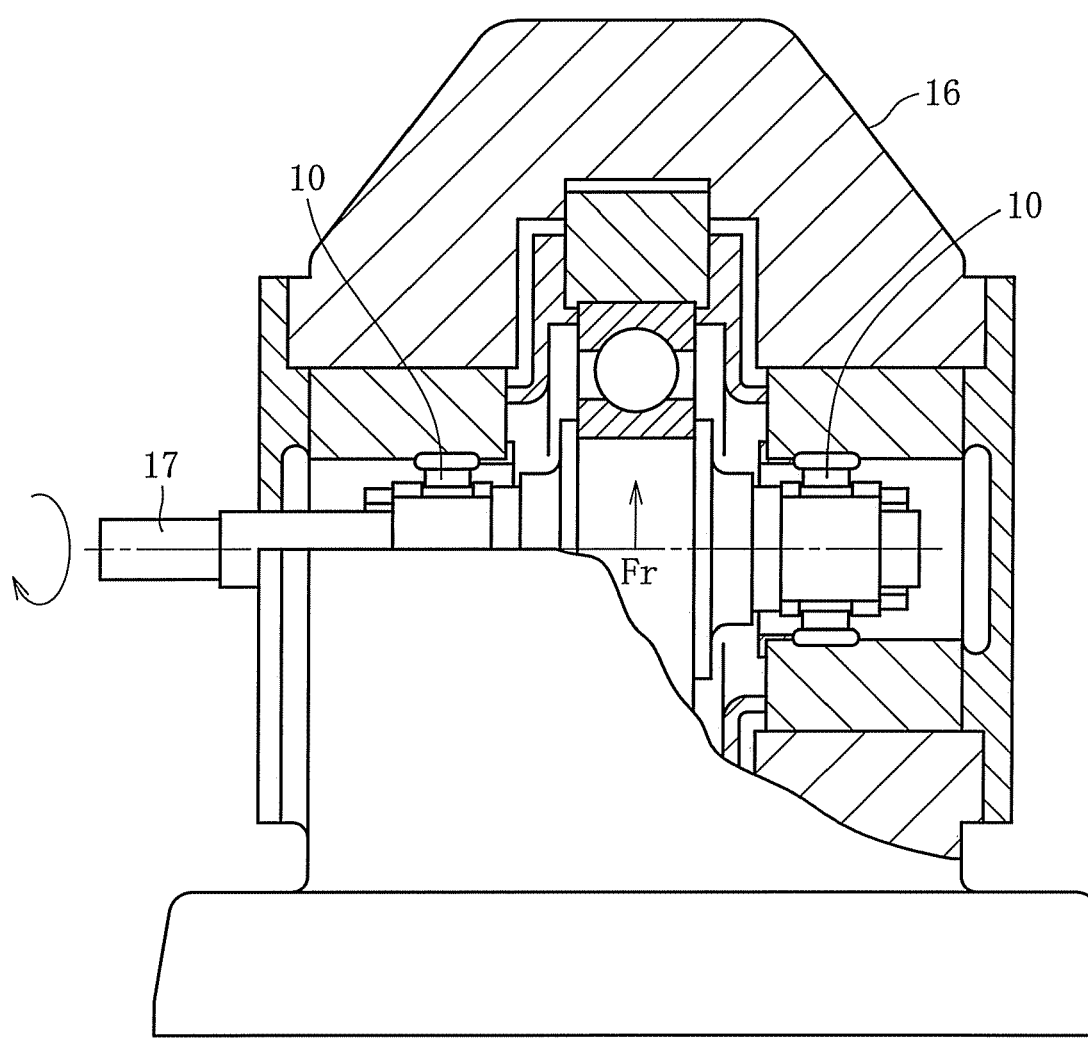
[FIG. 7] A partial sectional view of a testing apparatus.
Figures 8, 9:
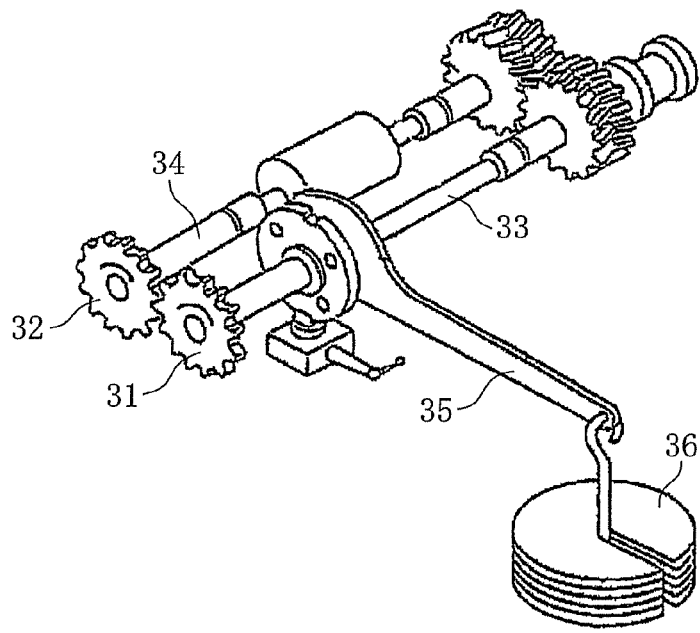
[FIG. 8] Table illustrating test results of the first embodiment.
[FIG. 9] A partial perspective view of a spur gear testing machine.

DESCRIPTION OF SYMBOLS 2 input shaft
4 output shaft
5 counter shaft
7 gear
10 roller bearing
12 needle-like roller

The invention claimed is:

1. A gear, comprising a plurality of concave recesses randomly formed on a tooth surface,
    wherein an average area of each of the recesses is greater than 250 µm² and not more than 11667 µm²;
    wherein an axial surface roughness parameter Rymax of the surface provided with the recesses is set to a range: 1.3 µm<Rymax<3.0 µm.

2. A gear according to claim 1, wherein an axial surface roughness parameter Rqni of the surface provided with the recesses is set to a range: 0.13 µm≦Rqni≦0.5 µm.

3. A gear according to claim 1, wherein the surface provided with the recesses has an area ratio of the recesses within a range of 35 to 75%.

4. A gear according to claim 1,
    wherein the gear has in a surface layer thereof a nitrogen-enriched layer, and
    wherein a grain size number of austenite crystal grains of the nitrogen-enriched layer is in a range in excess of 10.

5. A gear according to claim 4, wherein a nitrogen content of the nitrogen-enriched layer ranges from 0.1% to 0.7%.

6. A gear drive unit, comprising:
    a drive gear driven by a drive force; and
    a driven gear driven through mesh-engagement with respect to the drive gear,
    wherein at least one of the drive gear and the driven gear is a gear according to claim 1.

* * * * *